US012085749B2

(12) United States Patent
Hanzawa et al.

(10) Patent No.: US 12,085,749 B2
(45) Date of Patent: Sep. 10, 2024

(54) OPTICAL FIBER EVALUATION DEVICE AND OPTICAL FIBER EVALUATION METHOD

(71) Applicant: NIPPON TELEGRAPH AND TELEPHONE CORPORATION, Tokyo (JP)

(72) Inventors: Nobutomo Hanzawa, Musashino (JP); Takashi Matsui, Musashino (JP); Yuto Sagae, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 125 days.

(21) Appl. No.: 18/009,784

(22) PCT Filed: Jun. 24, 2020

(86) PCT No.: PCT/JP2020/024854
§ 371 (c)(1),
(2) Date: Dec. 12, 2022

(87) PCT Pub. No.: WO2021/260855
PCT Pub. Date: Dec. 30, 2021

(65) Prior Publication Data
US 2023/0221487 A1 Jul. 13, 2023

(51) Int. Cl.
*H04B 10/00* (2013.01)
*G02B 6/02* (2006.01)
*H04J 14/00* (2006.01)

(52) U.S. Cl.
CPC ..... *G02B 6/02042* (2013.01); *G02B 6/02342* (2013.01)

(58) Field of Classification Search
CPC ....... H04J 14/052; G02B 6/02042; G06T 7/70
See application file for complete search history.

(56) References Cited

U.S. PATENT DOCUMENTS

2018/0372954 A1* 12/2018 Matsui ................ G02B 6/4221
2022/0291452 A1* 9/2022 Ohzeki .................... G06T 7/33

OTHER PUBLICATIONS

ITU-T G.652, "Characteristics of a single-mode fibre and cable", 2016.

(Continued)

*Primary Examiner* — Daniel G Dobson
(74) *Attorney, Agent, or Firm* — Harness, Dickey & Pierce, P.L.C.

(57) ABSTRACT

The purpose of the present invention is to provide an optical fiber evaluation equipment and an optical fiber evaluation method that evaluate the center of a cladding of an MCF and a deviation of the center of each core of the MCF from a design value with ease and high accuracy.

The optical fiber evaluation equipment according to the present invention approximates the outside diameter of a cladding by a circle, based on a cross-sectional image of an MCF, and determines the center of the circle as the center of the cladding. In addition, the optical fiber evaluation equipment according to the present invention obtains the center coordinates of cores with an origin at the center of the circle, rotates the cross-sectional image so as to minimize a difference between the center coordinates and design coordinates of each core, and derives the minimum value thereof as the amount of deviation of the center of each core.

4 Claims, 5 Drawing Sheets

(56) References Cited

OTHER PUBLICATIONS

ITU-T G.651.1, "Characteristics of a 50/125 μm multimode graded index optical fibre and cable for the optical access network", 2018.
ITU-T G.650.1, "Definitions and test methods for linear, deterministic attributes of single-mode fibre and cable", 2018.
JIS-C 6822, "Test methods for structural parameters of optical fibers—Dimensional characteristics", 2009 with machine generated English translation thereof.
T. Matsui et al., "118.5 Tbit/s Transmission over 316 km-Long Multi-Core Fiber with Standard Cladding Diameter", OECC 2017, 2-s2892, 2017.

\* cited by examiner

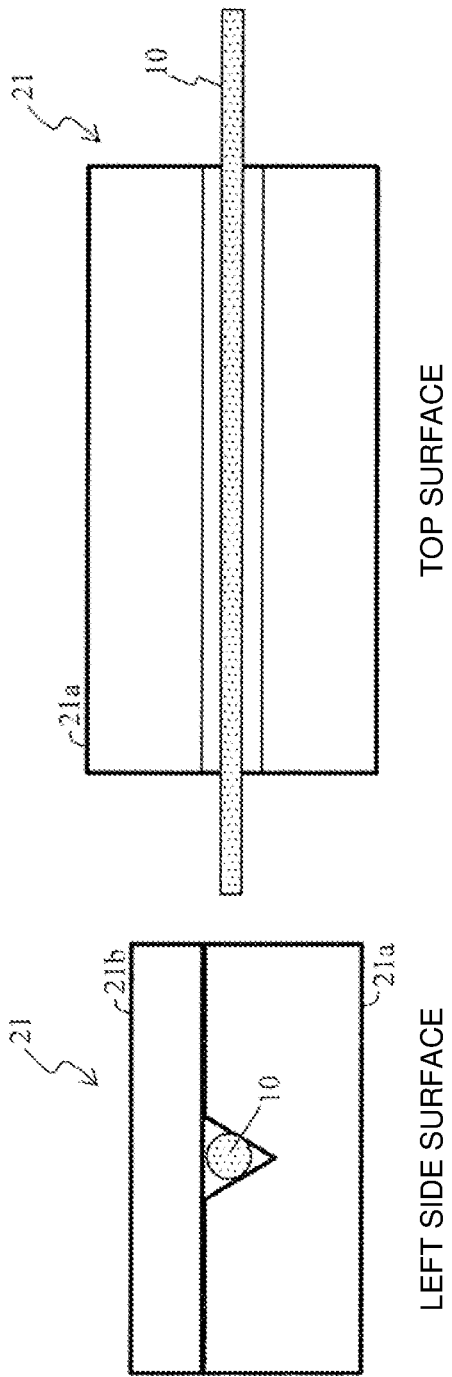

OPTICAL FIBER EVALUATION DEVICE AND OPTICAL FIBER EVALUATION METHOD

CROSS-REFERENCE TO RELATED APPLICATIONS

This application is a 371 U.S. National Phase of International Application No. PCT/JP2020/024854, filed on Jun. 24, 2020. The entire disclosure of the above application is incorporated herein by reference.

TECHNICAL FIELD

The present disclosure relates to an optical fiber evaluation equipment and an optical fiber evaluation method that evaluate the geometric structure of a multi-core optical fiber.

BACKGROUND ART

In current single-mode fibers and multi-mode fibers, optical characteristics and geometric structure parameters are standardized to ensure interconnectivity (Non-Patent Literatures 1 and 2). These optical fibers are single-core fibers that has a core in the center of a cladding; and therefore, a test method for evaluating the amount of deviation between the center of the cladding and the center of the core is shown (Non-Patent Literatures 3 and 4).

CITATION LIST

Non-Patent Literature

Non-Patent Literature 1: ITU-T G.652, "Characteristics of a single-mode fibre and cable," 2016.
Non-Patent Literature 2: ITU-T G.651.1, "Characteristics of a 50/125 µm multimode graded index optical fibre and cable for the optical access network," 2018.
Non-Patent Literature 3: ITU-T G.650.1, "Definitions and test methods for linear, deterministic attributes of single-mode fibre and cable," 2018.
Non-Patent Literature 4: JIS-C 6822, "Test methods for structural parameters of optical fibers—Dimensional characteristics," 2009.
Non-Patent Literature 5: T. Matsui et. al., "118.5 Tbit/s Transmission over 316 km-Long Multi-Core Fiber with Standard Cladding Diameter," OECC 2017, 2-s2892, 2017.

SUMMARY OF THE INVENTION

Technical Problem

In a multi-core optical fiber (Multi Core Fiber: MCF, e.g., Non-Patent Literature 5) having a plurality of cores in a cladding, it is necessary to evaluate the amount of deviations in the center positions of the plurality of cores in addition to the center of the cladding. As for an MCF having a core arranged in the center of a cladding, a relative relationship between the center of the cladding and the center of the core can be grasped by using techniques in Non-Patent Literatures 3 and 4; however, the amount of deviations of other cores is difficult to measure. In addition, as for the MCF disclosed in Non-Patent Literature 5, a core does not exist in the center of the optical fiber and therefore, even a relative relationship between the center of a cladding and the center of the core is difficult to grasp.

Therefore, in order to solve the above problems, the present invention aims to provide an optical fiber evaluation equipment and an optical fiber evaluation method that evaluate the center of a cladding of an MCF and a deviation of the center of each core of the MCF from a design value, with ease and high accuracy.

Means for Solving the Problem

In order to achieve the above object, an optical fiber evaluation equipment according to the present invention approximates the outside diameter of a cladding by a circle, based on a cross-sectional image of an MCF, and determines the center of the circle as the center of the cladding. In addition, the optical fiber evaluation equipment according to the present invention obtains the center coordinates of cores with an origin at the center of the circle, rotates the cross-sectional image so as to minimize a difference between the center coordinates and design coordinates of each core, and derives the minimum value thereof as the amount of deviation of the center of each core.

More specifically, the optical fiber evaluation equipment according to the present invention includes: an image capture unit that captures a cross-sectional image at one end of a multi-core optical fiber; and a computation circuit. The computation circuit performs: approximating a circumference of a cladding of the multi-core optical fiber by a circle based on the cross-sectional image; determining the center and diameter of the circle as the center and diameter of the multi-core optical fiber, respectively and defining any coordinate system with an origin at the center of the multi-core optical fiber on the cross-sectional image; detecting measurement centers that are the centers of cores of the multi-core optical fiber from the cross-sectional image; overlaying, on the cross-sectional image, design centers that are the centers of cores on design of the multi-core optical fiber, with the origin at the center on design of the multi-core optical fiber; detecting an inter-core distance between the measurement center and the design center for each core of the multi-core optical fiber and calculating an average value or mean-square value of the inter-core distances of all the cores of the multi-core optical fiber; deriving a rotation angle in the coordinate system which minimizes the average value or mean-square value; and determining each of the inter-core distances at the rotation angle as the amount of deviation of each core of the multi-core optical fiber.

In addition, an optical fiber evaluation method according to the present invention includes: capturing a cross-sectional image at one end of a multi-core optical fiber; approximating a circumference of a cladding of the multi-core optical fiber by a circle based on the cross-sectional image; determining the center and diameter of the circle as the center and diameter of the multi-core optical fiber, respectively and defining any coordinate system with an origin at the center of the multi-core optical fiber on the cross-sectional image; detecting measurement centers that are the centers of cores of the multi-core optical fiber from the cross-sectional image; overlaying, on the cross-sectional image, design centers that are the centers of cores on design of the multi-core optical fiber, with the origin at the center on design of the multi-core optical fiber; detecting an inter-core distance between the measurement center and the design center for each core of the multi-core optical fiber and calculating an average value or mean-square value of the inter-core distances of all the cores of the multi-core optical fiber; deriving a rotation angle in the coordinate system which minimizes the average value or mean-square value;

and determining each of the inter-core distances at the rotation angle as the amount of deviation of each core of the multi-core optical fiber.

In particular, it is preferable that the optical fiber evaluation equipment and method according to the present invention obtain a cross-sectional image of an MCF as follows:

The image capture unit of the optical fiber evaluation equipment according to the present invention includes: a holding mechanism that linearly holds the multi-core optical fiber; a light source that makes light incident on another end of the multi-core optical fiber; an image capture apparatus that captures the entire cross section of the one end of the multi-core optical fiber as an entire image; an optical image capture apparatus that obtains an intensity distribution of light emitted from each of the cores at the one end of the multi-core optical fiber; and a switching apparatus that switches between the image capture apparatus and the optical image capture apparatus for imaging at the one end of the multi-core optical fiber. The computation circuit determines a peak position of the intensity distribution as the measurement center.

In addition, the optical fiber evaluation method according to the present invention includes, in capturing the cross-sectional image: making light incident on the other end of the multi-core optical fiber; obtaining an entire image that is a captured image of the entire cross section of the one end of the multi-core optical fiber; obtaining an intensity distribution of light emitted from each of the cores at the one end of the multi-core optical fiber; and determining a peak position of the intensity distribution as the measurement center.

The optical fiber evaluation equipment and method according to the present invention synthesize an image in which the entire cross section of an MCF is captured and an image in which the intensity distribution of light emitted from a core part of the optical fiber is captured, approximate the outside diameter of a cladding by a circle on the synthesized cross-sectional image, and determine the center of the circle as the center of the cladding. In addition, the optical fiber evaluation equipment and method according to the present invention calculate the amount of deviation of the center of each core by performing fitting between the cross section on the synthesized image and a design cross section so as to minimize an (square-sum) average value of distances between the observation positions of the cores relative to the center of the cladding and design positions.

Thus, the present invention can provide an optical fiber evaluation equipment and an optical fiber evaluation method that evaluate the center of a cladding of an MCF and a deviation of the center of each core of the MCF from a design value with ease and high accuracy.

Effects of the Invention

The present invention can provide an optical fiber evaluation equipment and an optical fiber evaluation method that evaluate the center of a cladding of an MCF and a deviation of the center of each core of the MCF from a design value with ease and high accuracy.

BRIEF DESCRIPTION OF DRAWINGS

FIG. 5 is a diagram that illustrates a holding mechanism of the optical fiber evaluation equipment according to the present invention.

DESCRIPTION OF EMBODIMENTS

Embodiments of the present invention will be described with reference to attached drawings. The embodiments described below are examples of the present invention and the present invention is not limited to the embodiments described below. It should be noted that in this description and the drawings, the components denoted by the same reference signs are the same as each other.

Figure 1:
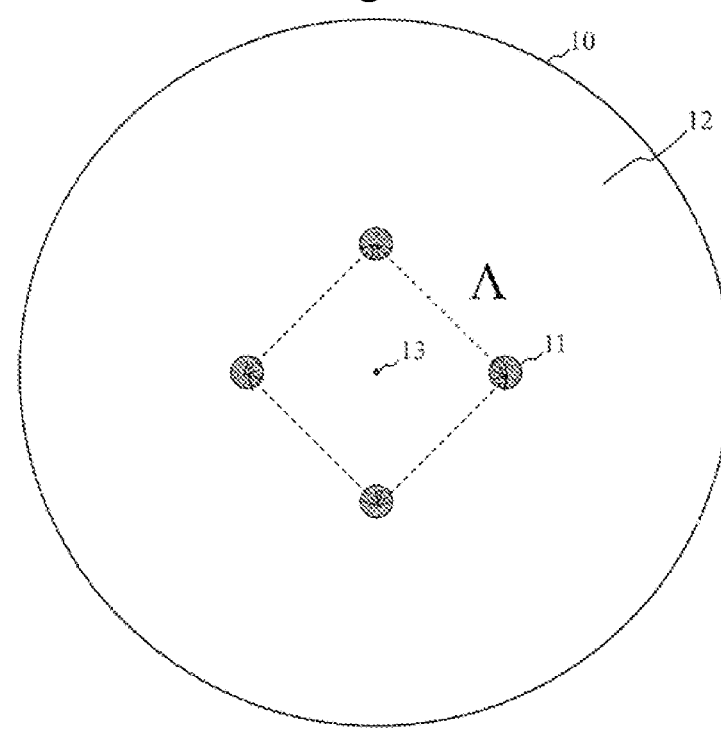
FIG. 1 is a cross-sectional view that illustrates a multi-core optical fiber.
Figure 2:
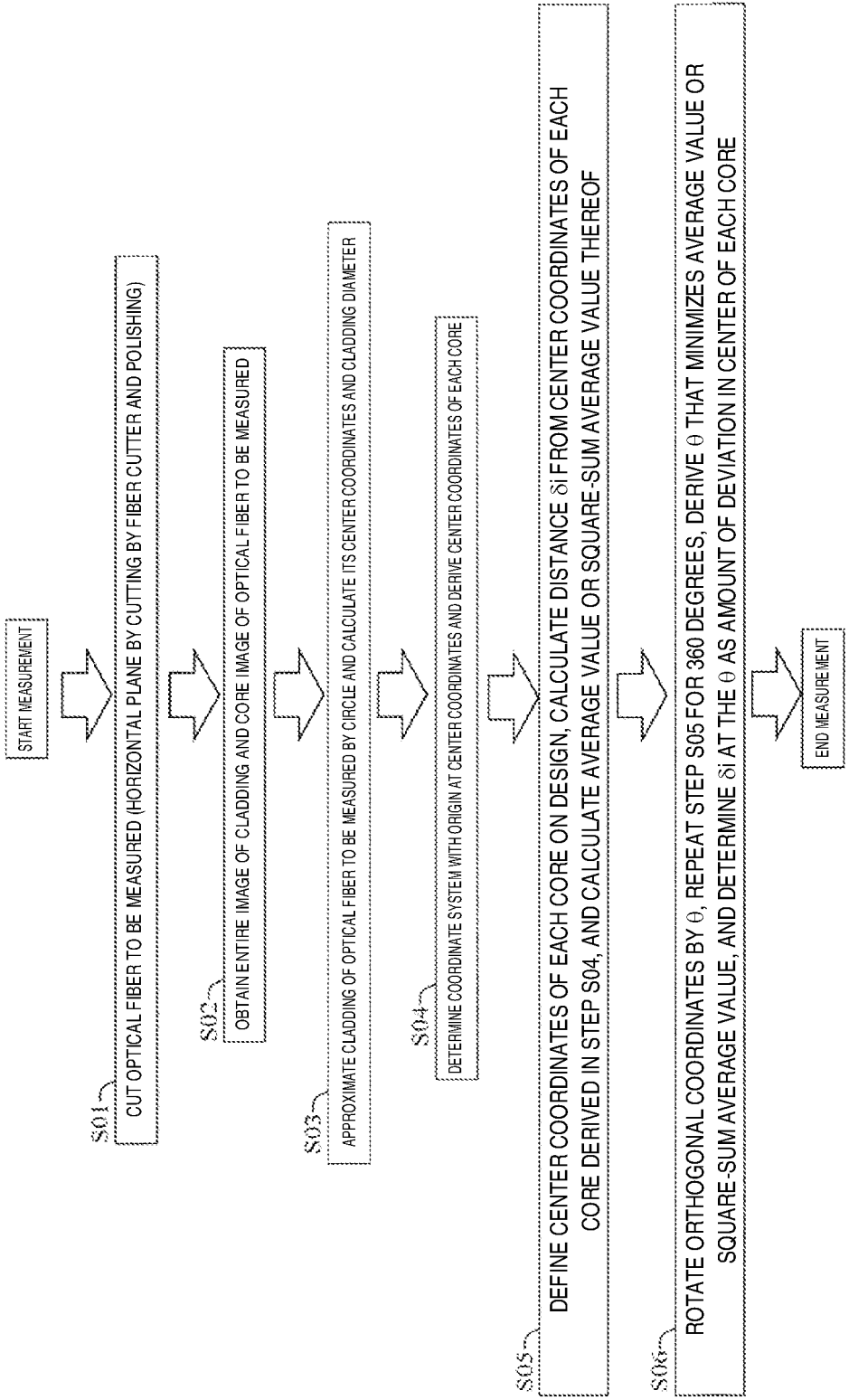
FIG. 2 is a flowchart that describes an optical fiber evaluation method according to the present invention.

FIG. 1 is a diagram that illustrates a cross-sectional image of an optical fiber to be measured. In this embodiment, a multi-core optical fiber 10 in which four cores 11 are arranged in a square lattice with space A in a single circular cladding 12 is used as the optical fiber to be measured. The space A is a distance between the centers of the cores 11. It should be noted that an optical fiber evaluation method of the present invention is not limited to the evaluation of the multi-core optical fiber 10 such as in FIG. 1. The optical fiber evaluation method of the present invention can also evaluate the following multi-core optical fibers:

(1) a multi-core optical fiber having four or more cores
(2) a multi-core optical fiber having a core at a cladding center 13
(3) a multi-core optical fiber having a plurality of cores concentrically arranged at different distances from the cladding center 13 (a multi-core optical fiber having cores arrayed in a plurality of layers)
(4) a multi-core optical fiber having a plurality of cores arranged in a linear form (in a non-rotationally symmetrical form) in a cladding FIG. 2 is a flowchart that describes an optical fiber evaluation method of this embodiment. The optical fiber evaluation method includes: capturing a cross-sectional image at one end of a multi-core optical fiber (steps S01, S02); approximating a circumference of a cladding of the multi-core optical fiber by a circle based on the cross-sectional image (step S03); determining the center and diameter of the circle as the center and diameter of the multi-core optical fiber, respectively and defining any coordinate system with an origin at the center of the multi-core optical fiber on the cross-sectional image (steps S03, S04); detecting measurement centers that are the centers of cores of the multi-core optical fiber from the cross-sectional image (step S04); overlaying, on the cross-sectional image, design centers that are the centers of cores on design of the multi-core optical fiber, with the origin at the center on design of the multi-core optical fiber (step S05); detecting an inter-core distance between the measurement center and the design center for each core of the multi-core optical fiber and calculating an average value or mean-square value of the inter-core distances of all the cores of the multi-core optical fiber (step S05); deriving a rotation angle in the coordinate system which minimizes the average value or mean-square value (step S06); and determining each of the inter-core distances at the rotation angle as the amount of deviation of each core of the multi-core optical fiber (step S06).

Figure 3:
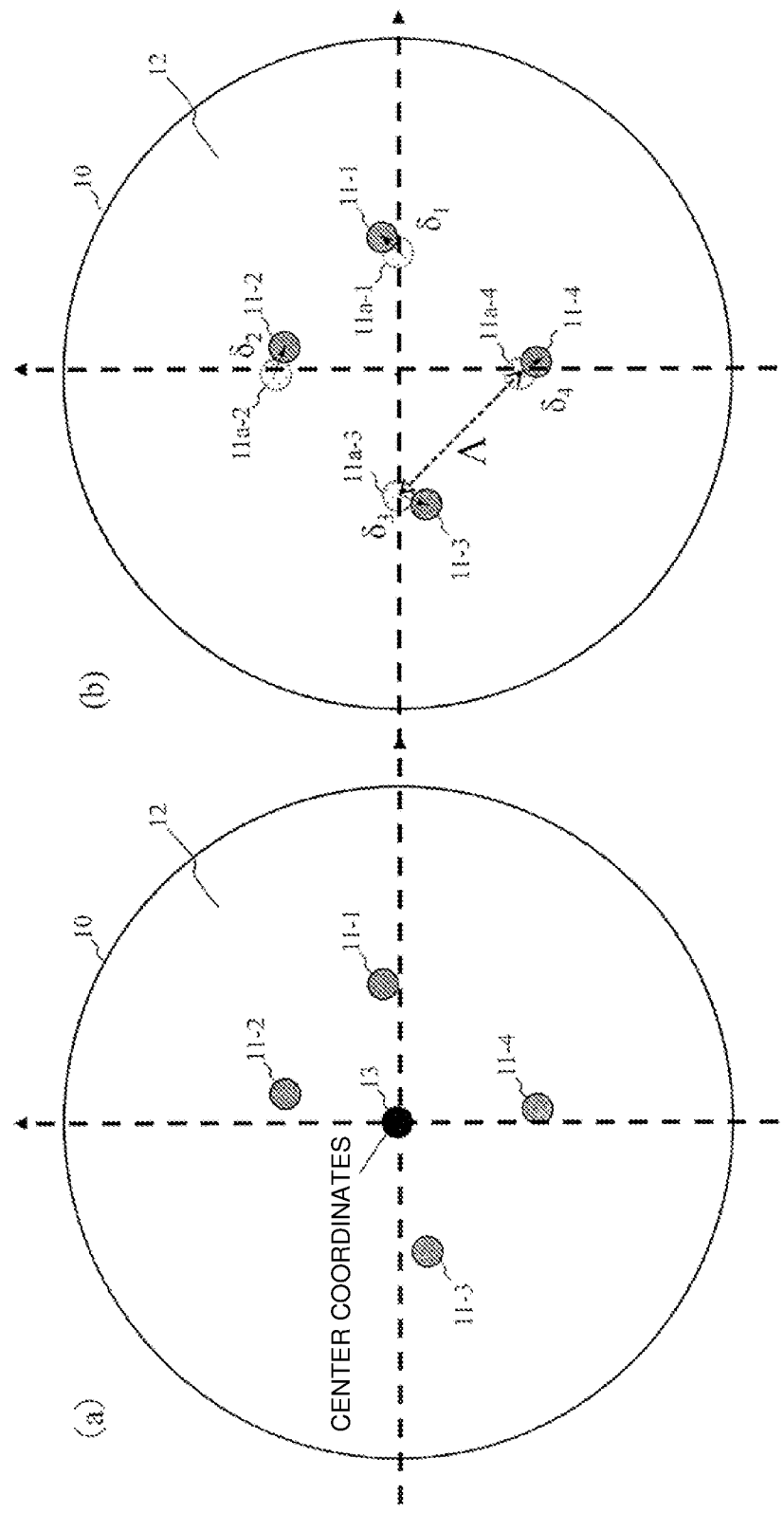
FIG. 3 is an image diagram that illustrates the optical fiber evaluation method according to the present invention. Solid line circles and broken-line circles indicate measurement core positions and design core positions, respectively.

FIG. 3 is a diagram that illustrates an evaluation image of the optical fiber evaluation method. FIG. 3(a) is an implementation image of the steps S03 and S04. FIG. 3(b) is an implementation image of the step S05 in FIG. 2.

The optical fiber evaluation method will be described in more detail by using FIG. 2 and FIG. 3.

At the step S01, an optical fiber to be measured is cut. For cutting the optical fiber, an existing fiber cutter can be used. In addition, it is preferable that a cut end surface be cleaved vertically to the longitudinal direction of the optical fiber; and also, it is effective that the cut end surface is polished to increase flatness.

At the step S02, the entire image of a cladding of the optical fiber to be measured is obtained.

At the step S03, as in FIG. 3(a), the circumference of the cladding is approximated by a circle and its center coordinates are derived and at the same time, a cladding diameter as the diameter of the approximate circle is calculated.

At the step S04, as in FIG. 3(a), a coordinate system with an origin at the center coordinates is determined and the center coordinates of each core 11 are derived. In this example, the coordinate system is described as an orthogonal coordinate one. For example, it makes it possible that, in obtaining an image at the step S02, visible light is made incident on each core of the optical fiber to be measured and the center coordinates of the core is determined from the luminance distribution of the obtained image. This scheme allows more easy and higher accurate acquisition of core coordinates.

It should be noted that in a case where the outer circle of a cladding and cores can be sufficiently recognized from the image obtained at the step S02 so that the center of a cladding and the centers of the cores can be sufficiently measured, making visible light incident on each core of the optical fiber to be measured and obtaining the coordinates of the centers of the cores from the intensity distribution thereof may be omitted. The coordinates of each core 11 thus obtained from an image are described as "measurement center coordinates."

At the step S05, by using a core space A on design of the optical fiber to be measured, the center coordinates of each core 11a on design are plotted on the orthogonal coordinates. The center coordinates of each core 11a on design are described as "design center coordinates." In addition, as in FIG. 3(b), a distance $\delta i$ (i represents a core number) between the design center coordinates and measurement center coordinates of each core is calculated and an average or mean-square of the distance $\delta i$ is calculated.

At the step S06, the orthogonal coordinates are rotated by $\theta$ with an origin at the center coordinates and the evaluation in step S05 is performed. The $\theta$ is rotated for 360 degrees to determine $\theta$ which minimizes the average value or mean-square value of the distance $\delta i$. The distance $\delta i$ at the $\theta$ is determined as the amount of deviation of the center of each core of the optical fiber to be measured.

Figure 4:
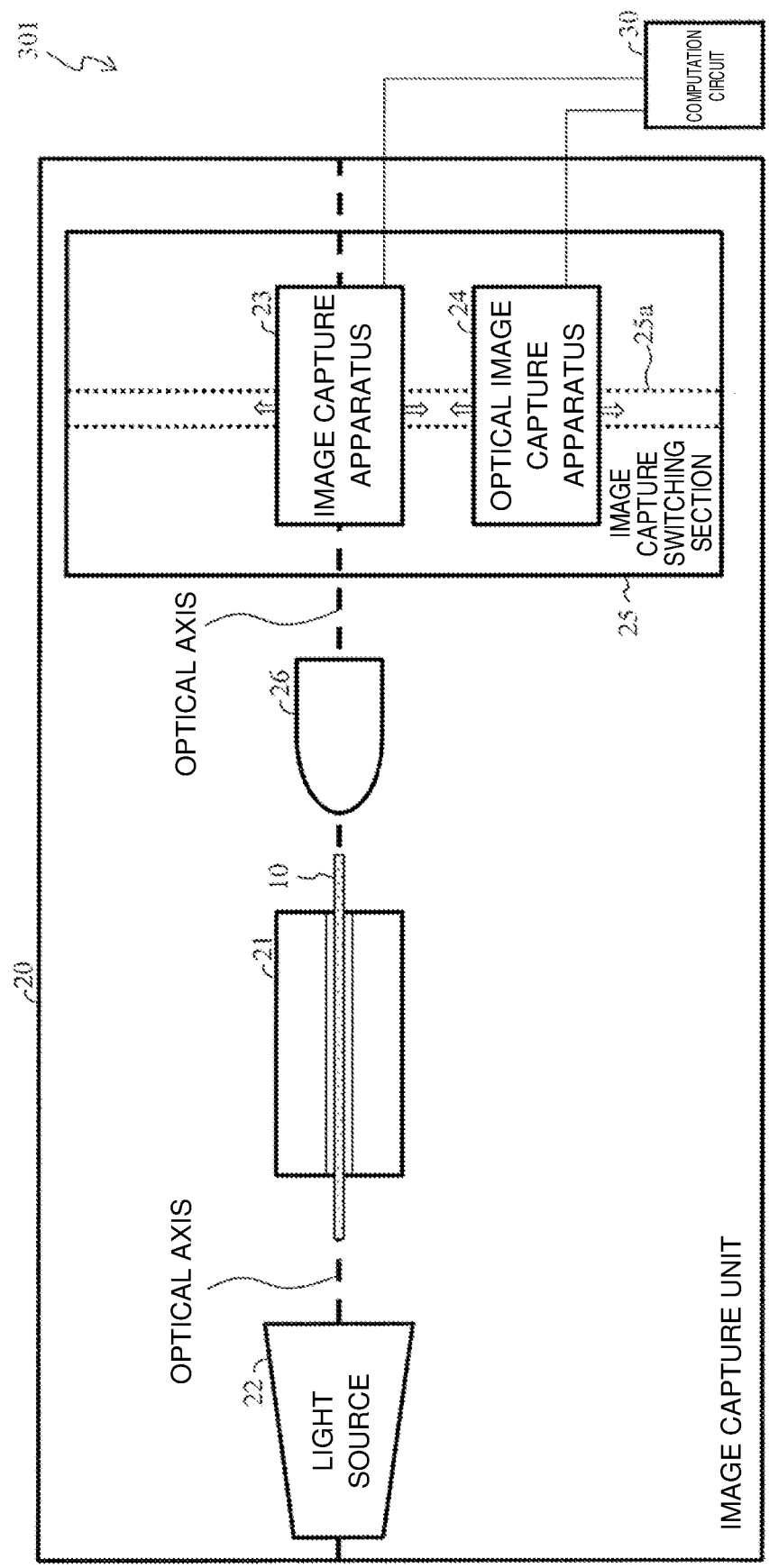
FIG. 4 is an image diagram that illustrates an optical fiber evaluation equipment according to the present invention.

FIG. 4 is a diagram that illustrates an optical fiber evaluation equipment 301 implementing the optical fiber evaluation method described with FIG. 2. The optical fiber evaluation equipment 301 includes: an image capture unit 20 that captures a cross-sectional image at one end of the multi-core optical fiber 10; and a computation circuit 30. The computation circuit 30 performs: approximating an circumference of a cladding 12 of the multi-core optical fiber 10 by a circle based on the cross-sectional image; determining the center and diameter of the circle as the center and diameter of the multi-core optical fiber 10, respectively and defining any coordinate system with an origin at the center of the multi-core optical fiber 10 on the cross-sectional image; detecting measurement centers that are the centers of cores 11 of the multi-core optical fiber 10 from the cross-sectional image; overlaying, on the cross-sectional image, design centers that are the centers of cores 11a on design of the multi-core optical fiber 10, with the origin at the center on design of the multi-core optical fiber 10; detecting an inter-core distance $\delta i$ between the measurement center and the design center for each core of the multi-core optical fiber 10 and calculating an average value or mean-square value of the inter-core distances $\delta i$ of all the cores of the multi-core optical fiber 10; deriving a rotation angle $\theta$ in the coordinate system which minimizes the average value or mean-square value; and determining each of the inter-core distances at the rotation angle $\theta$ as the amount of deviation of each core 11 of the multi-core optical fiber 10.

The image capture unit 20 includes: a holding mechanism 21 that linearly holds the multi-core optical fiber 10; a light source 22 that makes light incident on another end of the multi-core optical fiber 10; an image capture apparatus 23 that captures the entire cross section of the one end of the multi-core optical fiber 10 as an entire image; an optical image capture apparatus 24 that obtains the intensity distribution of light emitted from each of the cores at the one end of the multi-core optical fiber 10; and a switching apparatus 25 that switches between the image capture apparatus and the optical image capture apparatus for imaging at the one end of the multi-core optical fiber 10.

The optical fiber evaluation equipment 301 includes: the light source 22; the holding mechanism 21; an objective lens 26; the image capture apparatus 23 for capturing an image of the cross section of the multi-core optical fiber 10; the optical image capture apparatus 24 for determining the centers of cores of the multi-core optical fiber 10; and the image capture switching section 25 that switches between the two image capture apparatuses.

The light source 22 is a white light source such as a halogen lamp that generates white light including visible light and near-infrared light. As long as the entire cladding of the multi-core optical fiber 10 can be irradiated, the light may be collected by a lens or the like.

FIG. 5 is a diagram that illustrates the holding mechanism 21. The holding mechanism 21 includes: a substrate 21a on which a V groove where the multi-core optical fiber 10 is arranged is formed; and a clamp part 21b that holds the multi-core optical fiber 10 to prevent it from moving.

The objective lens 26 has a magnification that allows image capture of the entire cladding on the cross section of the multi-core optical fiber 10. In a case where the objective lens 26 has a magnification that allows image capture of only part of the cladding on the cross section of the multi-core optical fiber 10, an image of the entire cross section of the multi-core optical fiber 10 may be captured while performing scanning on the cross section of the multi-core optical fiber 10 by moving the objective lens 26 and the image capture switching section 25 (including the image capture apparatus and the optical image capture apparatus) simultaneously.

The light source 22, the multi-core optical fiber 10, and the objective lens 26 are arranged to be aligned with an optical axis L. It should be noted that "the multi-core optical fiber 10 is aligned to the optical axes of the light source 22 and the objective lens 26" means that the center axis of the multi-core optical fiber 10 substantially coincides with the optical axis so that light from the light source 22 can be made incident on the multi-core optical fiber. Conversely, as long as light from the light source 22 can be made incident on the multi-core optical fiber, it is not necessary to make the center axis of the multi-core optical fiber 10 completely coincide with the optical axis.

The image capture apparatus 23 and the optical image capture apparatus 24 have an imaging range that allows sufficient imaging of the field of view of the objective lens 26. The image capture apparatus 23 can capture an image of the entire cross section of the multi-core optical fiber 10. The optical image capture apparatus 24 can capture an image of the intensity distribution of near infrared light that is emitted from the cores of the multi-core optical fiber 10. It should be noted that in a case where the outer circle of a cladding and cores can be sufficiently recognized by the image capture apparatus 23 so that the center of a cladding and the center of the cores can be sufficiently measured, measurement of the coordinates of the centers of the cores using the optical image capture apparatus 24 may be omitted.

The image capture switching section 25 is configured so as to be able to capture two kinds of images of the cross section of the multi-core optical fiber 10. For example, the image capture switching section 25 has the image capture apparatus 23 and the optical image capture apparatus 25 arranged on an identical rail 25a. The image capture switching section 25 may have the image capture apparatus 23 and the optical image capture apparatus 25 arranged on a revolver or the like, not a rail. When an image of the entire cross section of the multi-core optical fiber 10 is captured by the image capture apparatus 23, the image capture switching section 25 moves the image capture apparatus 23 to the position of the optical axis L on the rail 25a. In addition, when an image of the intensity distribution of near infrared light that is emitted from the cores of the multi-core optical fiber 10 is captured by the optical image capture apparatus 24, the image capture switching section 25 moves the optical image capture apparatus 24 to the position of the optical axis L on the rail 25a.

The computation circuit 30 synthesizes the image of the entire cladding that is captured by the image capture unit 20 and the image of the intensity distribution of each core. Then, the computation circuit 30 performs the step S03 through the step S06 that are described with FIG. 2, and thereby can measure both the diameter of a cladding and the amount of deviation of the center coordinates of each core of the multi-core optical fiber 10.

As described above, the optical fiber evaluation equipment 301 can evaluate the geometric structure (the center of a cladding, the diameter of the cladding, and the amount of deviation of the center of each core) of the multi-core optical fiber 10 having a plurality of cores arranged in any state, with ease and high accuracy.

POINT OF THE INVENTION

By setting the center of a cladding and a design center as a reference, the geometric structure of any optical fiber not having a core in the center of the optical fiber can be evaluated.

In order to evaluate the center of each core in a multi-core structure with high accuracy, it is necessary to grasp the direction of deviation (rotation angle deviation) of each core in addition to the amount of deviation of the center of each core; however, in the present invention, the center of a cladding and the design center are used as a reference, it becomes unnecessary to individually evaluate rotation angle deviations.

REFERENCE SIGNS LIST

10 Multi-core optical fiber
11 Core
11a Core position on design
12 Cladding
13 Cladding center
20 Image capture unit
21 Holding mechanism
21a Substrate
21b Clamp part
22 Light source
23 Image capture apparatus
24 Optical image capture apparatus
25 Image capture switching section
25a Rail
26 Objective lens
30 Computation circuit
301 Optical fiber evaluation equipment

The invention claimed is:

1. An optical fiber evaluation equipment, comprising:
an image capture unit that captures a cross-sectional image at one end of a multi-core optical fiber; and
a computation circuit that performs:
approximating a circumference of a cladding of the multi-core optical fiber by a circle based on the cross-sectional image;
determining a center and diameter of the circle as a center and diameter of the multi-core optical fiber, respectively and defining any coordinate system with an origin at the center of the multi-core optical fiber on the cross-sectional image;
detecting measurement centers that are centers of cores of the multi-core optical fiber from the cross-sectional image;
overlaying, on the cross-sectional image, design centers that are the centers of cores on design of the multi-core optical fiber, with the origin at a center on design of the multi-core optical fiber;
detecting an inter-core distance between the measurement center and the design center for each core of the multi-core optical fiber and calculating an average value or mean-square value of the inter-core distances of all the cores of the multi-core optical fiber;
deriving a rotation angle in the coordinate system, the rotation angle minimizing the average value or mean-square value; and
determining each of the inter-core distances at the rotation angle as an amount of deviation of each core of the multi-core optical fiber.

2. The optical fiber evaluation equipment according to claim 1, wherein
the image capture unit includes:
a holding mechanism that linearly holds the multi-core optical fiber;
a light source that makes light incident on another end of the multi-core optical fiber;
an image capture apparatus that captures an entire cross section of the one end of the multi-core optical fiber, as an entire image;
an optical image capture apparatus that obtains an intensity distribution of light emitted from each of the cores at the one end of the multi-core optical fiber; and
a switching apparatus that switches between the image capture apparatus and the optical image capture apparatus for image capture at the one end of the multi-core optical fiber; and the computation circuit determines a peak position of the intensity distribution as the measurement center.

3. An optical fiber evaluation method, comprising:

capturing a cross-sectional image at one end of a multi-core optical fiber;

approximating a circumference of a cladding of the multi-core optical fiber by a circle based on the cross-sectional image;

determining a center and diameter of the circle as a center and diameter of the multi-core optical fiber, respectively and defining any coordinate system with an origin at the center of the multi-core optical fiber on the cross-sectional image;

detecting measurement centers that are centers of cores of the multi-core optical fiber from the cross-sectional image;

overlaying, on the cross-sectional image, design centers that are the centers of cores on design of the multi-core optical fiber, with the origin at a center on design of the multi-core optical fiber;

detecting an inter-core distance between the measurement center and the design center for each core of the multi-core optical fiber and calculating an average value or mean-square value of the inter-core distances of all the cores of the multi-core optical fiber;

deriving a rotation angle in the coordinate system, the rotation angle minimizing the average value or mean-square value; and determining each of the inter-core distances at the rotation angle as an amount of deviation of each core of the multi-core optical fiber.

4. The optical fiber evaluation method according to claim 3, the method comprising:

when capturing the cross-sectional image, making light incident on another end of the multi-core optical fiber;

obtaining an entire image, the entire image being a captured image of an entire cross section of the one end of the multi-core optical fiber;

obtaining an intensity distribution of light emitted from each of the cores at the one end of the multi-core optical fiber; and determining a peak position of the intensity distribution as the measurement center.

* * * * *